United States Patent Office 3,118,227
Patented Jan. 21, 1964

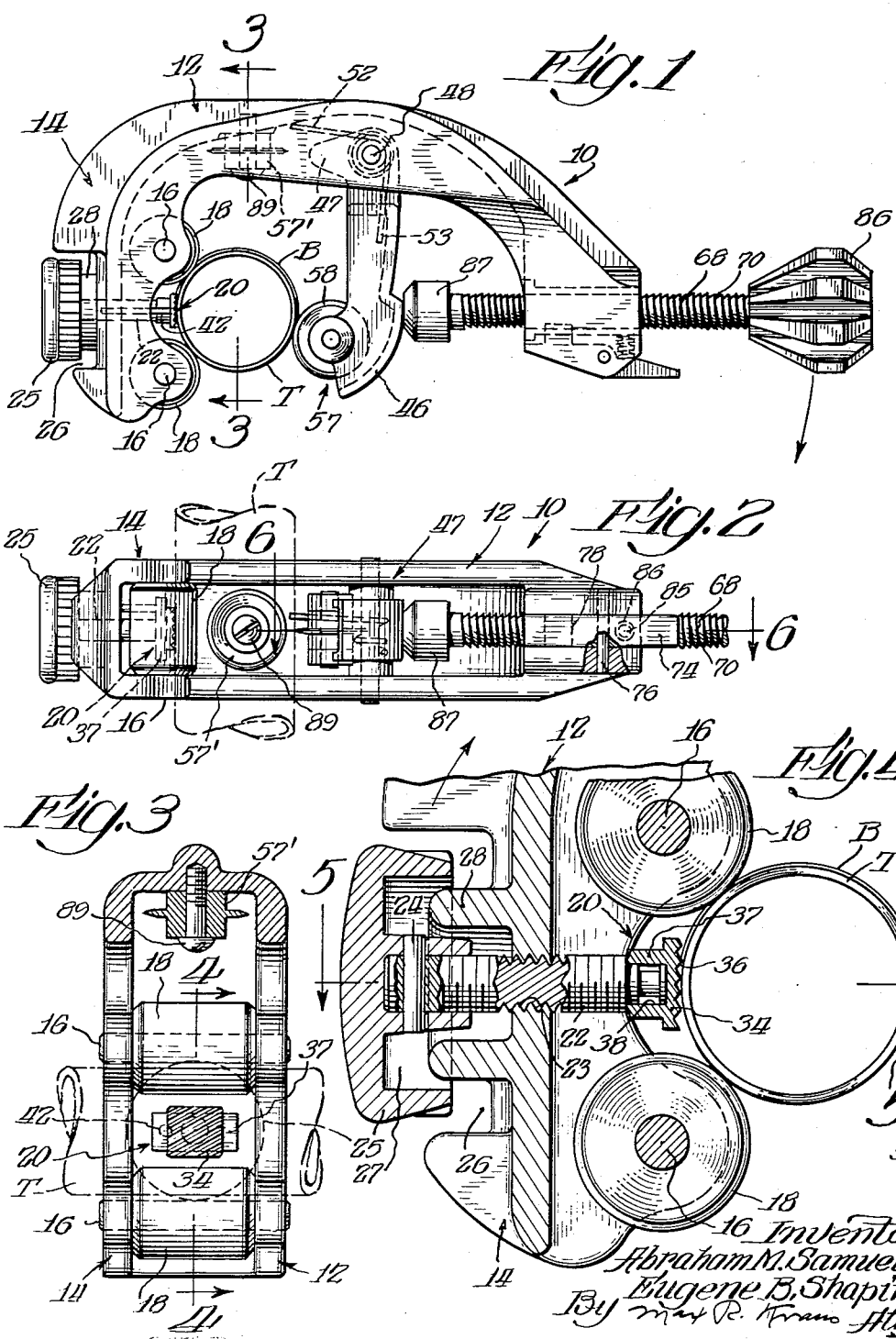

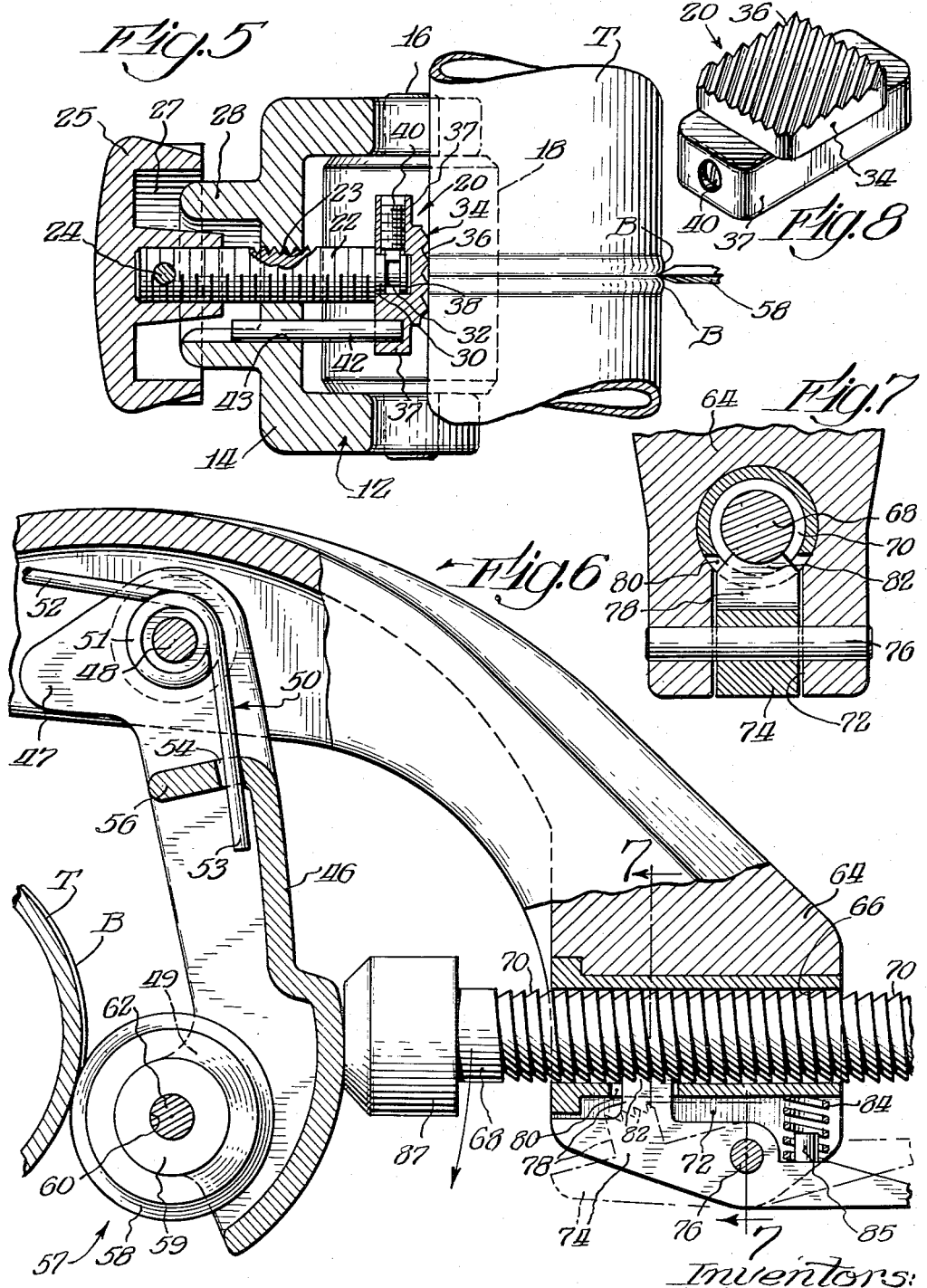

3,118,227
TUBE CUTTING DEVICE
Abraham M. Samuels, Chicago, and Eugene B. Shapiro, Skokie, Ill., assignors to Chicago Specialty Manufacturing Co., Chicago, Ill., a corporation of Illinois
Filed Sept. 19, 1961, Ser. No. 139,156
1 Claim. (Cl. 30—102)

This invention relates to a tube cutting device.

One of the objects of this invention is to provide a tube cutter with means for rapidly advancing and positioning the cutting wheel and for rapidly retracting the cutting wheel.

Another object of this invention is to provide a tube cutting device having means for simultaneously deburring the tube surface during the cutting operation.

In the normal use of tube cutting tools, burrs are formed on the surface of the tube at the point where the cutting wheel engages the tube or adjacent thereto, therefore, after the tube has been severed it has to be treated and/or handled to remove the burrs before the end of the tube can be coupled or jointed to a fitting. The burred surfaces would otherwise increase the outside diameter of the severed tube, and unless the burrs are removed the end of the tube cannot fit into the appropriate fitting. This additional handling and treatment of the cut tube for this purpose takes additional time and adds to the expense. With this invention this is entirely eliminated as the unit forming this invention is provided with a deburring element which operates against the tube surface while the cutting takes place so that as the cutting wheel operates to cut and thereby form burrs on the tube surface, the tube is in engagement with the deburring element on the opposite side of the cutting wheel to deburr the said surface, so that after the tube is severed the deburring has been completed.

Another object of this invention is to provide a tool of the foregoing character which is easy and quick to manipulate and wherein a number of operations, namely, cutting and deburring simultaneously takes place, resulting in economies not heretofore attained.

Other objects and advantages will become apparent as this description progresses.

In the drawings:

FIGURE 1 is a side elevational view of a tube cutting and deburring tool embodying this invention;

FIGURE 2 is a plan view of the tool looking upwardly as viewed in FIGURE 1;

FIGURE 3 is a view partly in section taken on lines 3—3 of FIGURE 1;

FIGURE 4 is a sectional view taken on lines 4—4 of FIGURE 3;

FIGURE 5 is a sectional view taken on line 5—5 of FIGURE 4;

FIGURE 6 is an enlarged view partly in section taken on line 6—6 of FIGURE 2;

FIGURE 7 is a sectional view taken on line 7—7 of FIGURE 6; and

FIGURE 8 is a perspective view of the deburring unit forming part of this invention.

The tube cutter generally indicated at 10 and shown as a complete unit in FIG. 1 has a frame 12 formed of a casting or forging provided with a laterally extending bearing end 14 at one end of the frame. The frame for the major portion of its length is channel shaped. The bearing end which is likewise channel or U-shaped in cross-section supports spaced pins 16 between its walls upon which are journaled spaced rollers 18. A space is provided between the rollers 18 for accommodating the deburring unit generally designated at 20 and best shown in FIGS. 4, 5 and 8.

The deburring unit 20 includes a threaded stem 22 having threaded engagement with the threaded opening 23 in the bearing end of the frame. The outer end of the threaded stem is fixedly secured as at 24 to a knob 25 for rotating said stem. The exterior surface of the bearing end 14 of the frame is recessed as at 26 to accommodate the knob 25.

Extending outwardly of the surface of the bearing end 14 within the recessed portion 26 is an annular extension or annular flange 28. The knob 25 has an annular recess 27 to accommodate the annular flange 28 when the knob is rotated inwardly.

The opposite end of the threaded stem 22 has a reduced diameter as at 30 and has an annular groove 32 (FIGS. 4 and 5). The deburring unit 20, best shown in FIG. 8, is mounted on the end of the threaded stem. The deburring unit 20 includes a plate 34 having teeth 36 which are inclined at approximately an angle of 30° with respect to the longitudinal axis of the tube T to be cut and deburred. Each tooth forms an inclined angle of approximately 90° so that deburring may be accomplished by rotating the tool either clockwise or counterclockwise.

The plate 34 is secured to or formed integrally with a rectangular shaped block 37, having an annular recess 38 opening rearwardly to accommodate the reduced end 30 of the threaded stem 22. A pin 40 is threadedly secured in the block 37 and said pin has a reduced end to seat within the groove 32 so that the stem 22 is rotatable with respect to the block 37 and deburring element thereon.

To prevent rotation of the deburring unit 20, a guide pin 42 is secured at one end to the block 37, with the opposite end of the pin slidingly passing through opening 43 in the wall of the bearing end 14. The deburring element 20 is advanced towards the tube T and away therefrom by rotating the knob 25. The deburring element is positioned between the rollers 18. The deburring unit here described permits the tool to be rotated clockwise or counterclockwise with respect to the tube T and permits the cutting and deburring to take place when rotated in either of said directions.

A spring biased arm is mounted on the frame. Said arm carries the cutting unit and is normally biased in a direction away from the tube to be cut. For example, the arm 46 is pivotally supported on a pin 48 which is anchored in the frame 12 and the arm is secured to said pin inside the channel walls of the frame. The base of the arm has a nose 47. The arm 46 is channel shaped in cross-section and a spring 50 has a coil 51 wrapped around the pin 48, with one end 52 of the spring resting against the inside of the frame 12 and the opposite end 53 of the spring resting against the arm 46 and confined in an opening 54 formed in a web 56 of the arm. The spring 50 normally biases the arm 46 to the right, as viewed in FIG. 1, or in a direction away from the tube T to be cut.

The cutting unit generally indicated at 57 has a central blade 58 with bosses 59 on the opposite sides of the blade, all preferably formed as an integral unit. The cutting unit has a transverse opening 60 and is freely rotatably mounted on a pin 62 supported by the spaced walls 49 of the channel shaped arm 46 at the outer end of arm 46.

The side of the frame 12 opposite the bearing end 14 is provided with an integral boss or collar portion 64 (FIG. 6) having a substantially circular opening 66 extending therethrough in the direction of the rollers 18. The opening 66 slidably receives a shaft 68 provided with buttress threads 70.

The boss or collar 64 has a rectangular shaped recess 72 in which a pawl or trigger 74 is pivotally mounted. The pawl or trigger 74 is pivotally supported on a pin 76 which is secured to the boss 64, with the trigger positioned between the vertical side walls of the recess 72. The trigger or pawl 74 has an extension 78 which passes through an opening 80 in the boss 64 of the frame. The extension 78 has a threaded surface 82 with teeth complementary to the buttress threads 70, as best shown in FIG. 6, for engagement with the buttress threads. A coil spring 84 is positioned in the recess 72 between the underside of the finger end of the trigger and the boss and surrounds an anchoring member 85 on the trigger for the purpose of normally biasing the trigger or pawl 74 so that the teeth 82 of the trigger are in engagement with the buttress threads 70, as seen in FIG. 6.

One end of the threaded shaft 68 has fixed thereto a knob 86 for rotating the shaft. The other end has a head 87 adapted to engage the curved outer surface of the arm 46 for the purpose of moving the arm 46 in a direction towards the rollers 18. The head 87 is mounted on the shaft 68 so that the shaft is rotatable with respect to the head.

The inside of the channeled frame 12 between the arm 46 and the rollers 18 provides a storage space for holding an extra cutting wheel 57′ in out of the way position. A threaded bolt 89 passes through the opening in the extra cutting unit and is threadedly secured to the frame for such purpose.

It will be seen that the arm 46 carrying the cutting wheel is normally biased in a direction away from the tube T to be cut, however, the position of the threaded shaft 68 limits the rearward position of the arm 46. The tube T is positioned between the rollers 18 and the arm 46 carrying the cutting wheel 57.

The buttress threaded shaft 68 may be advanced forwardly towards the arm 46 by rotating the threaded shaft 68, which is in engagement with the threads 82 of the trigger or pawl 74, or if a more rapid advance of the threaded shaft 68 is desired, the threaded shaft 68 is pushed forwardly and due to the buttress threads 70 and the threads 82 on the trigger or pawl 74 this is possible.

To retract the threaded shaft 68 and move the arm 46 and cutting unit 57 away from the tube T, the threaded shaft is rotated in the reverse direction, provided the trigger or pawl 74 is in engagement with the threaded shaft, as shown in FIG. 6, however, if a rapid retracting is desired it is effected by engaging the trigger 74 manually and pivoting same on pin 76 so that the teeth 82 of the trigger are disengaged from the buttress threads 70 of the shaft. When this occurs the spring biased arm 46 will push the threaded shaft 68 outwardly or to the right, as shown in FIG. 1, until the trigger 74 is manually released to engage the buttress threads or until the shaft 68 reaches the end of its rearward movement, as when the head 87 engages the frame 14. Moving the threaded shaft inwardly towards the rollers 18 will cause the arm 46 to pivot forwardly and movement of the threaded member outwardly will cause the arm 46 to pivot rearwardly due to the spring 50.

As is well understood, the tube T to be cut is clamped in position on a clamping device, not shown, and the tool 10 is positioned with respect to the tube, as shown in FIG. 1. The deburring unit 20 is adjusted and as the tool is rotated about the tube, the cutting wheel 58 is cutting into the tube T while the deburring unit 20 is shaving off the burred surface B of the tube adjacent the opposite edges of the groove formed by the cutting wheel on the tube. As the cutting wheel cuts deeper into the tube, the deburring unit 20 may be adjusted towards the tube by rotating the knob 25 to remove the burrs formed on the tube at the cutting surface.

The cutting and deburring takes place simultaneously so that after the tube has been severed the two severed ends of the tube are completely deburred and may be jointed or coupled to fittings without requiring any further treatment of the severed ends.

It will be understood that various changes and modifications may be made from the foregoing without departing from the spirit and scope of the appended claim.

What is claimed is:

A tube cutter comprising a frame, rollers journaled in the frame for contacting one side of the tube to be cut, an arm pivotally mounted on said frame, a cutter wheel supported on said arm, a spring engaging said arm for normally and constantly urging said arm to pivot away from the rollers, said normal urging of said pivotal arm away from the tube to be cut being limited by its engagement with movable means engaging said arm, said movable means engaging said arm for moving said arm in the direction of the rollers against the bias of the spring, said movable means including a shaft having a buttress thread, a trigger pivotally mounted on said frame, said trigger having teeth complementary to the buttress teeth for engaging said threaded shaft, spring means engaging said trigger to normally pivot said trigger so that the teeth engage said threaded shaft to permit said shaft to be rotated in either direction while said trigger teeth are in engagement with the buttress threads and for permitting rapid manual pushing of said shaft forwardly towards said arm while in such engagement, said trigger adapted to be manually pivoted to release the trigger teeth from engagement with said buttress teeth so that said spring biased arm retracts said shaft and moves said arm and cutter wheel away from the rollers.

References Cited in the file of this patent

UNITED STATES PATENTS

| | | |
|---|---|---|
| 234,689 | Saunders | Nov. 23, 1880 |
| 565,267 | Griffin | Aug. 4, 1896 |
| 680,866 | Katzki | Aug. 20, 1901 |
| 1,380,653 | Kilgour | June 7, 1921 |
| 1,484,023 | Hayter | Feb. 19, 1924 |
| 1,505,205 | Kilgour | Aug. 19, 1924 |
| 2,071,756 | Manville | Feb. 23, 1937 |
| 2,283,572 | Petersen | May 19, 1942 |

FOREIGN PATENTS

| | | |
|---|---|---|
| 2,709 | Great Britain | of 1880 |
| 1,519 | Great Britain | of 1912 |